US010317974B2

(12) United States Patent
Cooper (10) Patent No.: US 10,317,974 B2
(45) Date of Patent: Jun. 11, 2019

(54) POWER SUPPLY UNIT (PSU) SWITCHING (71) Applicant: Intel Corporation, Santa Clara, CA (US)

(72) Inventor: Barnes Cooper, Tigard, OR (US)

(73) Assignee: INTEL CORPORATION, Santa Clara, CA (US)

(*) Notice: Subject to any disclaimer, the term of this patent is extended or adjusted under 35 U.S.C. 154(b) by 0 days.

(21) Appl. No.: 15/094,367

(22) Filed: Apr. 8, 2016

(65) Prior Publication Data
US 2017/0293345 A1 Oct. 12, 2017

(51) Int. Cl.
G06F 1/32 (2019.01)
G06F 1/3203 (2019.01)
G06F 1/3206 (2019.01)
G06F 1/3246 (2019.01)
G06F 1/3287 (2019.01)

(52) U.S. Cl.
CPC .......... G06F 1/3203 (2013.01); G06F 1/3206 (2013.01); G06F 1/3246 (2013.01); G06F 1/3287 (2013.01); Y02D 10/171 (2018.01)

(58) Field of Classification Search
CPC .................. G06F 1/32; G06F 1/26; G06F 1/28
USPC ....... 713/300, 310, 320, 321, 322, 323, 324, 713/325, 345, 375
See application file for complete search history.

(56) References Cited

U.S. PATENT DOCUMENTS 6,701,442 B1 3/2004 Kunz et al.
8,063,619 B2* 11/2011 Zhu ........................... H02J 7/32
323/266
2002/0038328 A1* 3/2002 Morisawa ............. G06F 1/3203
718/1
2004/0148533 A1 7/2004 Nicholas
2011/0099389 A1 4/2011 Matula et al.
2012/0038339 A1 2/2012 Zhu et al.
2015/0277530 A1* 10/2015 Rathnakar ............... G06F 1/324
713/322
2015/0301573 A1* 10/2015 Venkumahanti ...... G06F 1/3206
713/323

(Continued)

FOREIGN PATENT DOCUMENTS

WO 2017/176340 A1 10/2017

OTHER PUBLICATIONS

International Search Report and Written Opinion received for International Application No. PCT/US2017/012248, dated Apr. 21, 2017, 12 pages.

(Continued)

Primary Examiner — Jaweed A Abbaszadeh
Assistant Examiner — Keshab R Pandey
(74) Attorney, Agent, or Firm — Jaffery, Watson, Mendonsa & Hamilton LLP (57) ABSTRACT In one example an electronic device comprises a power supply comprising an operating power rail and a standby power rail, a processing platform capable to switch between an operating power state and at least one low power state, a switch to selectively couple a power input of the processing platform to one of the operating power rail or the standby power output rail and logic, at least partially including hardware logic, to activate the switch based at least in part on the operating state of the processing platform. Other examples may be described.

13 Claims, 10 Drawing Sheets (56) References Cited

U.S. PATENT DOCUMENTS

2016/0026227 A1* 1/2016 Kharbutli ............... G06F 1/263
                                                        713/322
2016/0320821 A1* 11/2016 Mair .................... G06F 1/3296
2017/0147050 A1* 5/2017 Berke ...................... G06F 1/26

OTHER PUBLICATIONS

International Preliminary Report on Patentability for PCT Application No. PCT/US2017/012248, 9 pages, dated Oct. 18, 2018.

* cited by examiner

FIG. 1  ELECTRONIC DEVICE 100

POWER SUPPLY UNIT (PSU) SWITCHING

BACKGROUND

The subject matter described herein relates generally to the field of electronic devices and more particularly to a power supply unit (PSU) switching.

Existing main rail power supplies for electronic devices suffer from poor efficiency at low load levels such as those experienced when an electronic device is placed into a low power state, sometimes referred to as a sleep state or a standby state. For example, some main rail power supplies operate at efficiency levels of 20%-30% at 1%-3% DC load levels. By contrast, standby rails are commonly designed for low load conditions and operate at relatively high efficiency in low load conditions. Accordingly, power supply architectures which enable the use of standby rails to provide power to an electronic device operating in a low load level state may find utility.

BRIEF DESCRIPTION OF THE DRAWINGS

The detailed description is described with reference to the accompanying figures.

DETAILED DESCRIPTION

Described herein are exemplary systems and methods to implement power supply unit (PSU) switching in electronic devices. In the following description, numerous specific details are set forth to provide a thorough understanding of various examples. However, it will be understood by those skilled in the art that the various examples may be practiced without the specific details. In other instances, well-known methods, procedures, components, and circuits have not been illustrated or described in detail so as not to obscure the particular examples.

As described above, it may be useful to provide power supply units (PSUs) with the capability to provide low levels of power relatively high levels of efficiency. Subject matter described herein addresses this and other issues by providing the electronic device with logic which enables the electronic device to switch between an operating power rail of the power supply to a standby power rail of the power supply when the electronic device transitions from an operating state to a low power state.

In some examples a processor in the electronic device enters a system management mode (SMM) prior to the transition from an operating state to a low power state. In some operating conditions the electronic device may transition directly from SMM to a low power state. However, if certain conditions are satisfied the processor may invoke the services of a separate controller to manage aspects of the power state transition process. The processor may be configured to enter SMM in response to a system management interrupt (SMI) from the controller and may be configured to transition to a low power state. The controller may execute logic which configures a switch to switch between an operating power rail of the power supply to a standby power rail of the power supply when the electronic device transitions from an operating state to a low power state. The operating power rail(s) of the power supply unit may then be shut down.

In some examples, at least some of the power consumption states discussed herein may be in accordance with or similar to those defined under Advanced Configuration and Power Interface (ACPI) specification, Revision 5, December 2011. For example, the phrase "operating power state" may refer to a normal operating mode (e.g., L0). While the phrase low power state may refer to a sleep mode (e.g., C8).

Additional features and operating characteristics of the electronic device and associated system are described below with reference to FIGS. 1-10.

Figure 1:
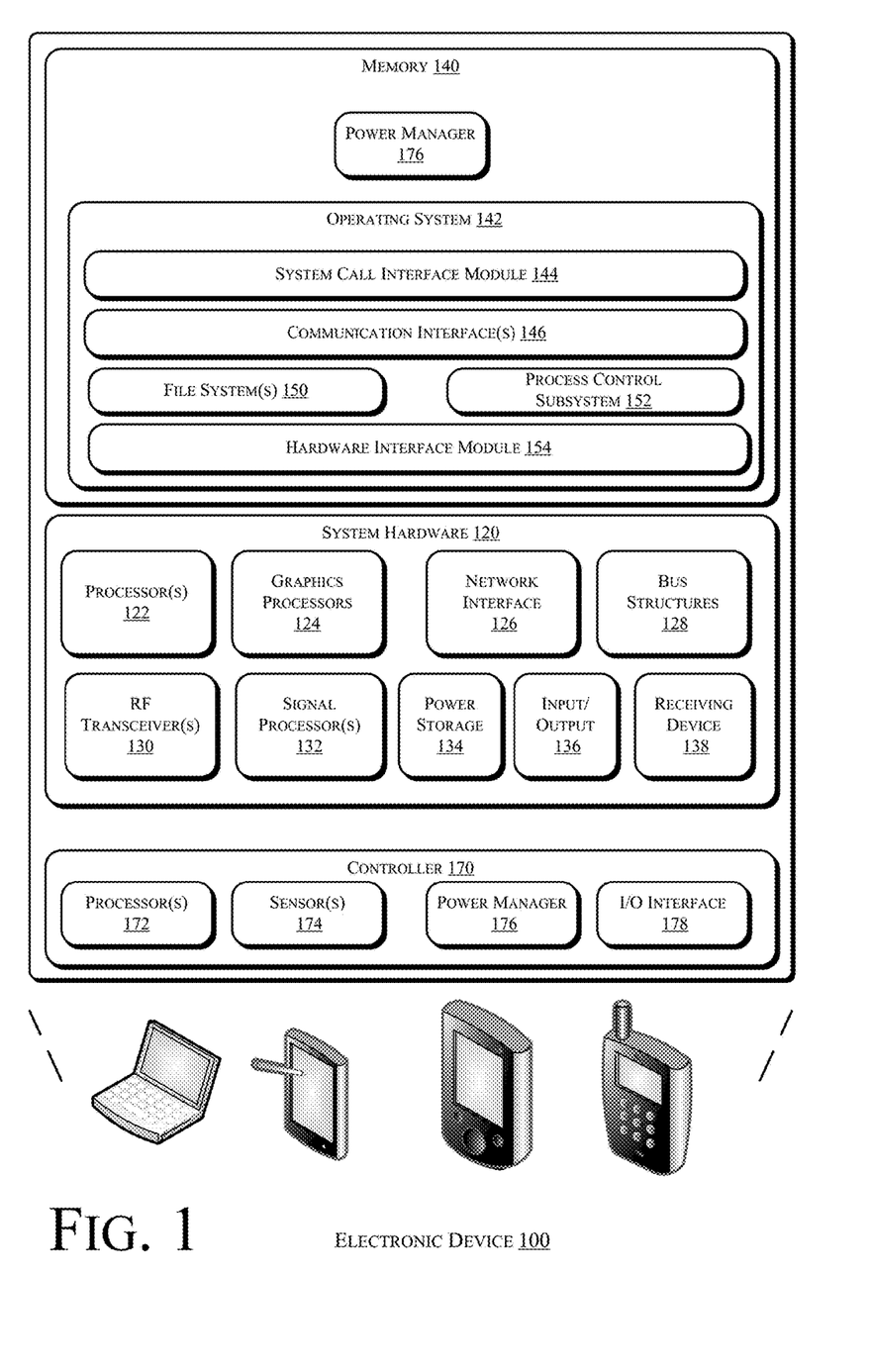
FIG. 1 is a schematic illustration of an electronic device which may be adapted to implement power supply unit (PSU) switching in accordance with some examples.

FIG. 1 is a schematic illustration of an electronic device 100 which may be adapted to include one or more wireless charging pads in accordance with some examples. In various examples, electronic device 100 may include or be coupled to one or more accompanying input/output devices including a display, one or more speakers, a keyboard, one or more other I/O device(s), a mouse, a camera, or the like. Other exemplary I/O device(s) may include a touch screen, a voice-activated input device, a track ball, a geolocation device, an accelerometer/gyroscope, biometric feature input devices, and any other device that allows the electronic device 100 to receive input from a user.

The electronic device 100 includes system hardware 120 and memory 140, which may be implemented as random access memory and/or read-only memory. A file store may be communicatively coupled to electronic device 100. The file store may be internal to electronic device 100 such as, e.g., eMMC, SSD, one or more hard drives, or other types of storage devices. Alternatively, the file store may also be external to electronic device 100 such as, e.g., one or more external hard drives, network attached storage, or a separate storage network.

System hardware 120 may include one or more processors 122, graphics processors 124, network interfaces 126, and bus structures 128. In one embodiment, processor 122 may be embodied as an Intel® Atom™ processors, Intel® Atom™ based System-on-a-Chip (SOC) or Intel® Core2 Duo® or i3/i5/i7 series processor available from Intel Corporation, Santa Clara, Calif., USA. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

Graphics processor(s) 124 may function as adjunct processor that manages graphics and/or video operations. Graphics processor(s) 124 may be integrated onto the motherboard of electronic device 100 or may be coupled via an expansion slot on the motherboard or may be located on the same die or same package as the Processing Unit.

In one embodiment, network interface 126 could be a wired interface such as an Ethernet interface (see, e.g., Institute of Electrical and Electronics Engineers/IEEE 802.3-2002) or a wireless interface such as an IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/ GSM Association, Ver. 3.0.1, December 2002).

Bus structures 128 connect various components of system hardware 128. In one embodiment, bus structures 128 may be one or more of several types of bus structure(s) including a memory bus, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI), a High Speed Synchronous Serial Interface (HSI), a Serial Low-power Inter-chip Media Bus (SLIMbus®), or the like.

Electronic device 100 may include an RF transceiver 130 to transceive RF signals, and a signal processing module 132 to process signals received by RF transceiver 130. RF transceiver may implement a local wireless connection via a protocol such as, e.g., Bluetooth or 802.11X. IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a WCDMA, LTE, general packet radio service (GPRS) interface (see, e.g., Guidelines on GPRS Handset Requirements, Global System for Mobile Communications/GSM Association, Ver. 3.0.1, December 2002).

Electronic device 100 may further include one or more power storage devices 134, e.g., batteries, and one or more input/output interfaces 136 such as, e.g., a keypad and/or a display. In some examples electronic device 100 may not have a keypad and use the touch panel for input.

Electronic device 100 may further include at least one wireless power receiving device 138 to receive power via an electromagnetic coupling with a driven coil in a charging device. The wireless power receiving device 138 may comprise one or more coil(s) to receive power through an inductive coupling with a driven coil or coupling charge plate(s) to receive power through a capacitive coupling with a driven capacitor in the charging device.

Memory 140 may include an operating system 142 for managing operations of electronic device 100. In one embodiment, operating system 142 includes a hardware interface module 154 that provides an interface to system hardware 120. In addition, operating system 140 may include a file system 150 that manages files used in the operation of electronic device 100 and a process control subsystem 152 that manages processes executing on electronic device 100.

Operating system 142 may include (or manage) one or more communication interfaces 146 that may operate in conjunction with system hardware 120 to transceive data packets and/or data streams from a remote source. Operating system 142 may further include a system call interface module 144 that provides an interface between the operating system 142 and one or more application modules resident in memory 140. Operating system 142 may be embodied as a UNIX operating system or any derivative thereof (e.g., Linux, Android, etc.) or as a Windows® brand operating system, or other operating systems.

In some examples an electronic device may include a controller 170, which may comprise one or more controllers that are separate from the primary execution environment. The separation may be physical in the sense that the controller may be implemented in controllers which are physically separate from the main processors. Alternatively, the trusted execution environment may logical in the sense that the controller may be hosted on same chip or chipset that hosts the main processors.

By way of example, in some examples the controller 170 may be implemented as an independent integrated circuit located on the motherboard of the electronic device 100, e.g., as a dedicated processor block on the same SOC die. In other examples the trusted execution engine may be implemented on a portion of the processor(s) 122 that is segregated from the rest of the processor(s) using hardware enforced mechanisms In the embodiment depicted in FIG. 1 the controller 170 comprises a processor 172, a sensor 174, a power manager 176, and an I/O interface 178. In some examples sensor(s) 174 may include a wireless communication capability to detect the presence of electronic device 100. Alternatively, sensor(s) 174 may comprise one or more of an optical sensor which detects the presence of electronic device 100 or a pressure sensor to detect the positioning of electronic device 100 on charger 200. The I/O module 178 may comprise a serial I/O module or a parallel I/O module. Because the controller 170 is separate from the main processor(s) 122 and operating system 142, the controller 170 may be made secure, i.e., inaccessible to hackers who typically mount software attacks from the host processor 122.

In some examples portions of the power manager 176 may reside in the memory 140 of electronic device 100 and may be executable on one or more of the processors 122. For example, portions of the power manager may be accessible through the basic input/output system (BIOS) of the electronic device 100.

Figure 2:
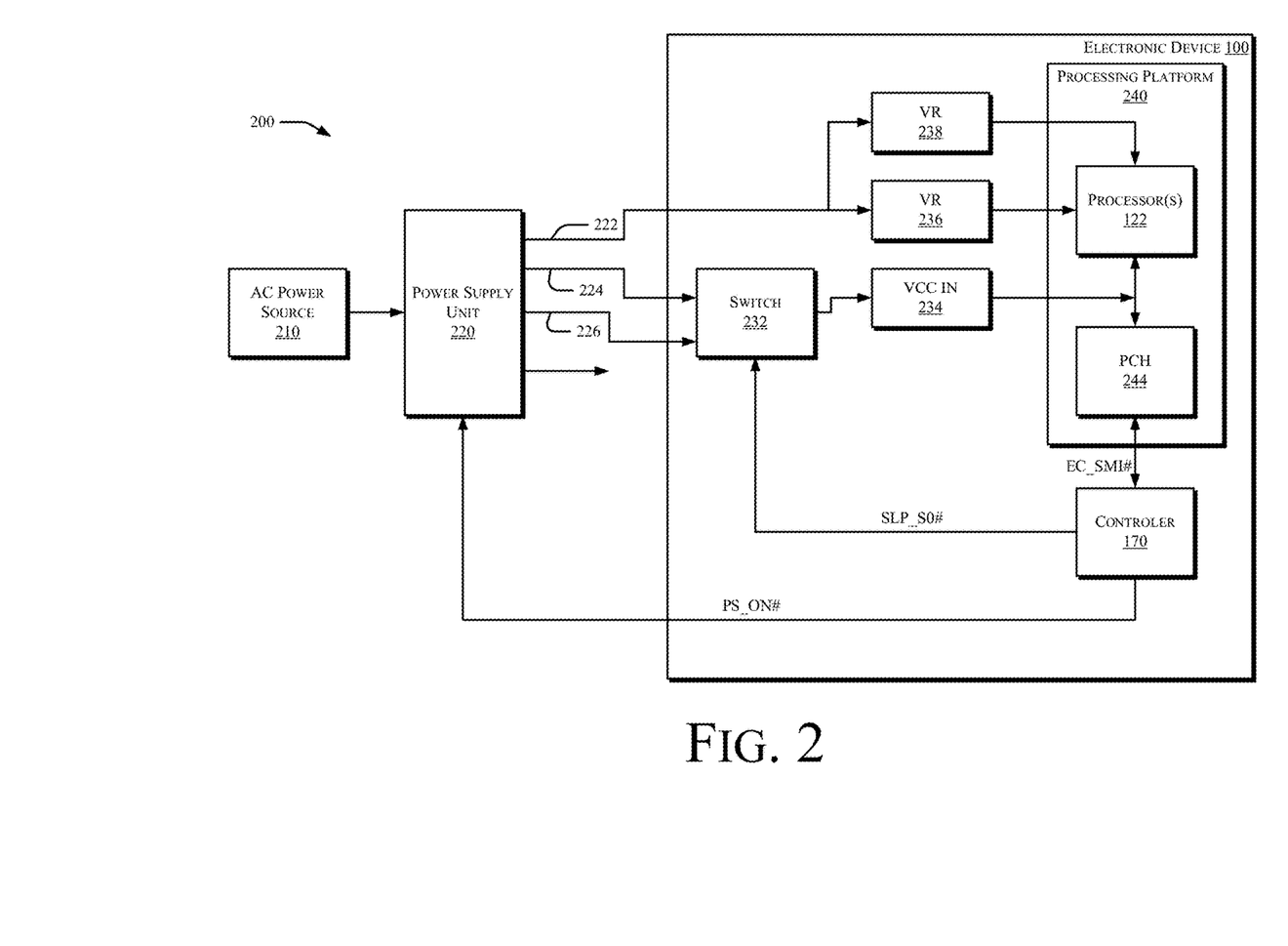
FIG. 2 is a schematic views of a power supply architecture for an electronic device which may be adapted to include power supply unit (PSU) switching in accordance with some examples.

FIG. 2 is a schematic views of a power supply architecture 200 for an electronic device which may be adapted to include power supply unit (PSU) switching in accordance with some examples. Referring to FIG. 2, in some examples a power supply architecture 200 may comprise a power supply unit 220 to receive power from an alternating current (AC) power source 210. Power supply unit 220 may comprise one or more operating power rails 222, 224 to provide power to an electronic device 100 when the device is in an operating state and one or more standby power rails 226 to provide power to the electronic device 100 is in a low power state. In some examples operating power rail 222 may provide a 12 volt direct current (12V DC) power while operating power rail 224 and standby power rail 226 may provide a 5 volt direct current (5V DC) power.

Electronic device 110 may comprise a switch 232, a VCC IN line 234, and one or more voltage regulators 236, 238. A processing platform 240 comprises one or more processors 122 and a platform control hub 244. An embedded controller 170 may be coupled to PCH 244 and to switch 232.

In some examples the operating power rail 222 may be coupled to voltage regulators 236, 238 which, in turn, provide power to processor(s) 122. Operating power rail 224 and standby power rail 226 are coupled to the input of switch 232, the output of which is coupled to VCC IN.

Figure 4:
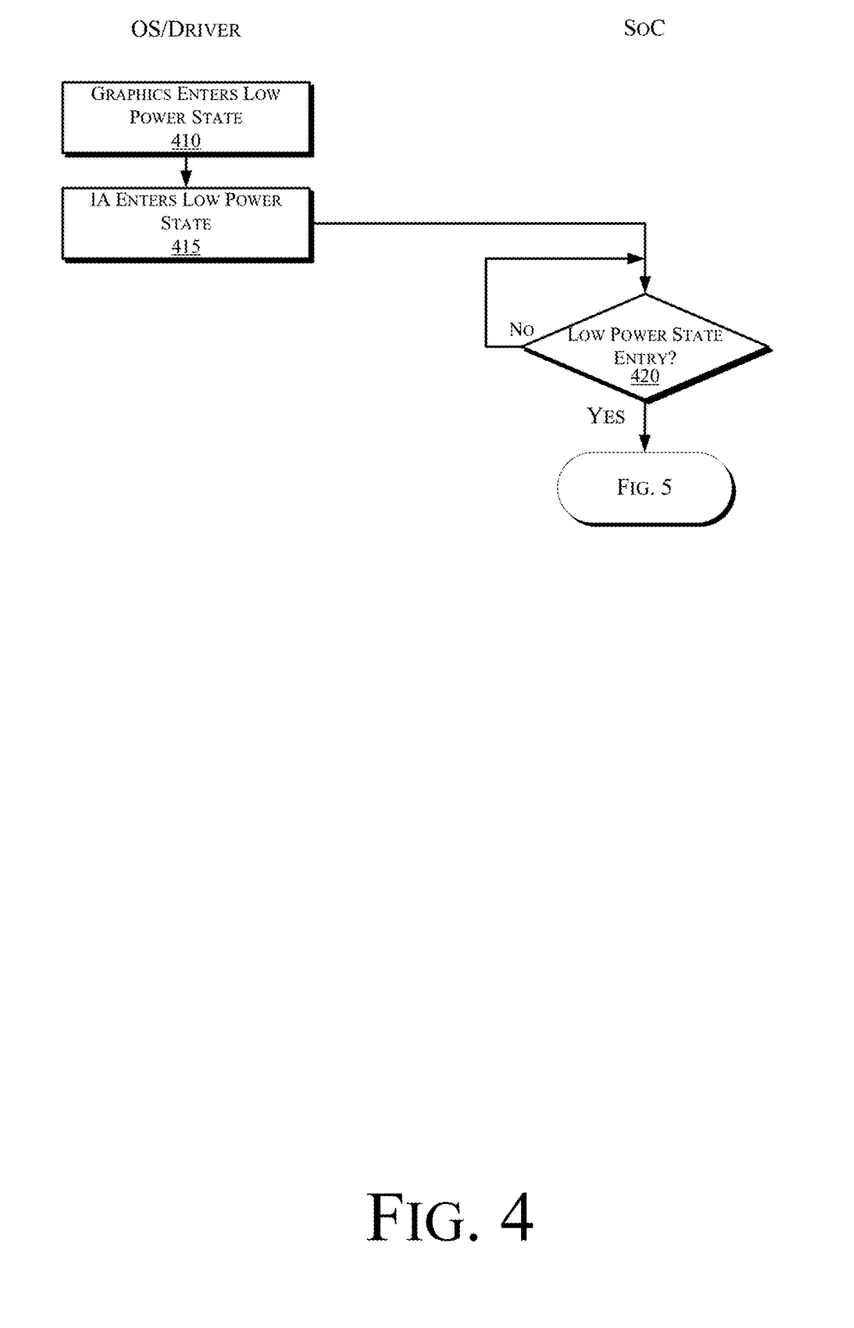
FIGS. 4-5 are flowcharts illustrating operations in a method to operate a power supply unit (PSU) switching in an electronic device in accordance with some examples.

In some examples the power managers 176 interact with one or more other components of the electronic device 100 to implement power supply (PSU) unit switching. In some examples the processor 122 is capable to switch between an operating power state and at least one low power state, e.g., a sleep state. In such examples, the power managers 176 implement operations which enables the electronic device 100 to switch between receiving power from an operating power rail 224 to receiving power from a standby power rail 226 based at least in part on an operating state of the processor 122. Referring to FIG. 4, in some examples at operation the operating system 142 of electronic device 100 triggers a transition for one or more components such as the graphics processor(s) 124 to enter low-power state (e.g., an RC6 power state) and at operation 415 the architecture enters a low power state (e.g., a CC6 power state) with a target of entering lower power state (e.g., a PC8 power state). This triggers the system to monitor, at operation 420, whether the processing platform 240 is to transition to the targeted low power state (e.g., a PC8 power state). If, at operation 420, the processing platform 240 is to transition to the targeted low power state, then control passes to the operations depicted in FIG. 5. In various examples the low power state may include one or more of a C3 state, a C4 state, a C5 state, a C6 state, a C7 state, a C8 state, a C9 state, or a C10 state.

Figure 5:
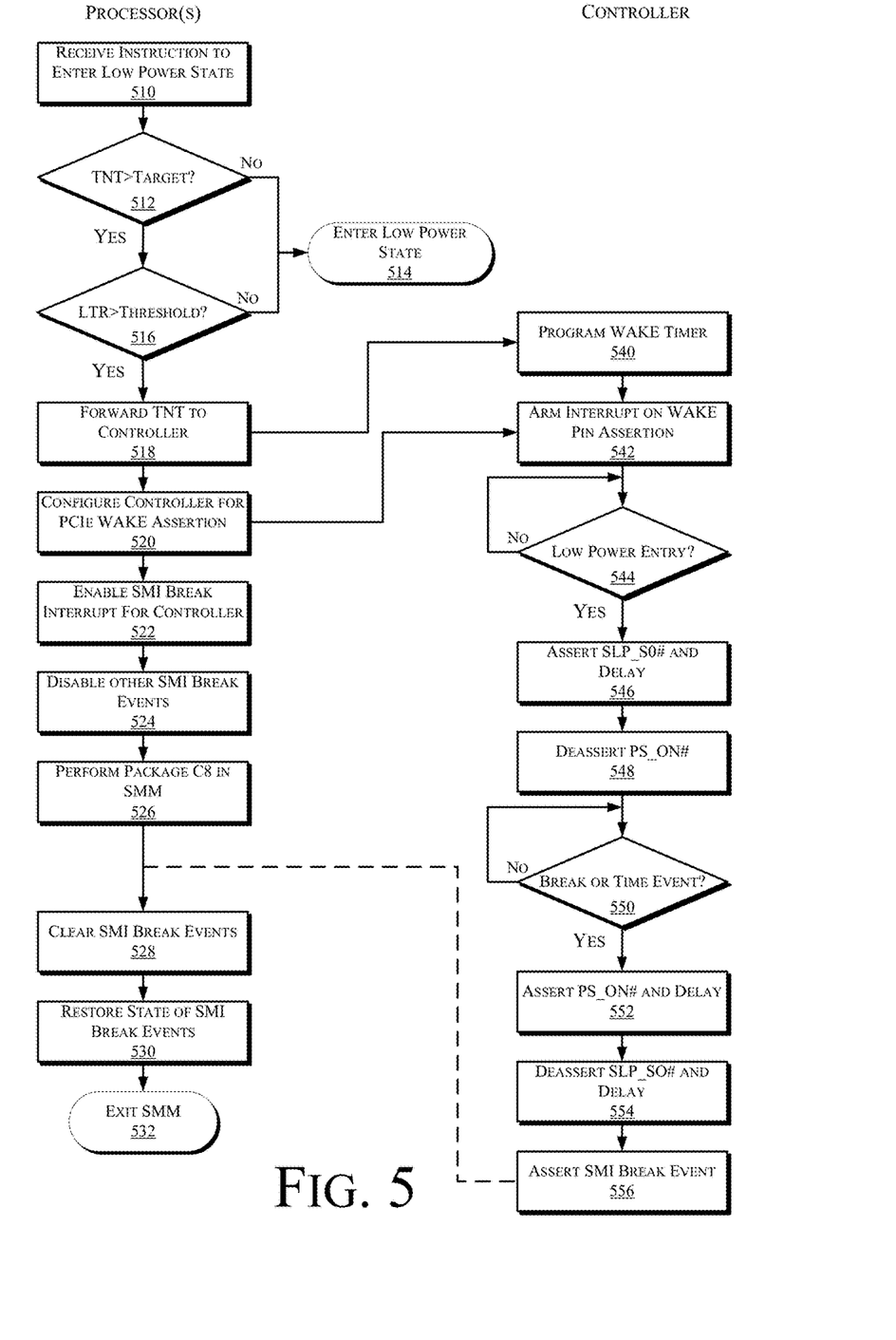

Referring to FIG. 5, at operation 510 the power manager 176 executing on one or more of the processors 124 receives an instruction to enter a target low power state, (e.g., a C8 power state). In some examples, in response to the instruction the processor(s) 124 may transition to a system management mode (SMM). If, at operation 512, the time to the next target wake event (TNT) is greater than a threshold value (e.g., 30 second) then control passes to operation 514 and the processor 242 transitions directly from SMM to the target low power state (e.g., a C8 power state). Similarly, if at operation 516 the system latency tolerance (LTR) is greater than a threshold value (e.g., 103 milliseconds) then control passes to operation 514 and the processor 242 transitions directly from SMM to the target low power state (e.g., a C8 power state).

By contrast, if the TNT is not greater than a threshold and the LTR is also not greater than a threshold then the operations continue to place the processor in the target low power state (e.g., a C8 power state). At operation 518 and the power manager 176 executing on the processor 122 forwards the TNT to the power manager 176 executing on the controller 170 and at operation 520 the power manager 176 executing on processor 122 forwards an instruction to configure the controller 170 to wake on a PCIe wake assertion.

At operation 522 the power manager 176 executing on the processor 122 enables a system management interrupt (SMI) break from system management mode (SMM) for the controller and at operation 524 the power manager 176 executing on the processor 122 disables all other SMI break events. At operation 526 the power manager 176 executing on the processor 124 transitions the processor 122 to a C8 power state from SMM.

In some examples the power manager 176 executing on controller 170 implements operations to trigger the switch 232 to change the input to VCC IN 234 from the operating power rail 224 to the standby power rail in a contemporaneous fashion. Thus, at operation 540 the power manager 176 executing on controller 170 programs a WAKE timer based on the TNT received from the power manager 176 executing on the processor 176. Similarly, at operation 540 the power manager 176 executing on controller 170 arms an interrupt for an assertion on the WAKE pin of the controller.

Figure 3:
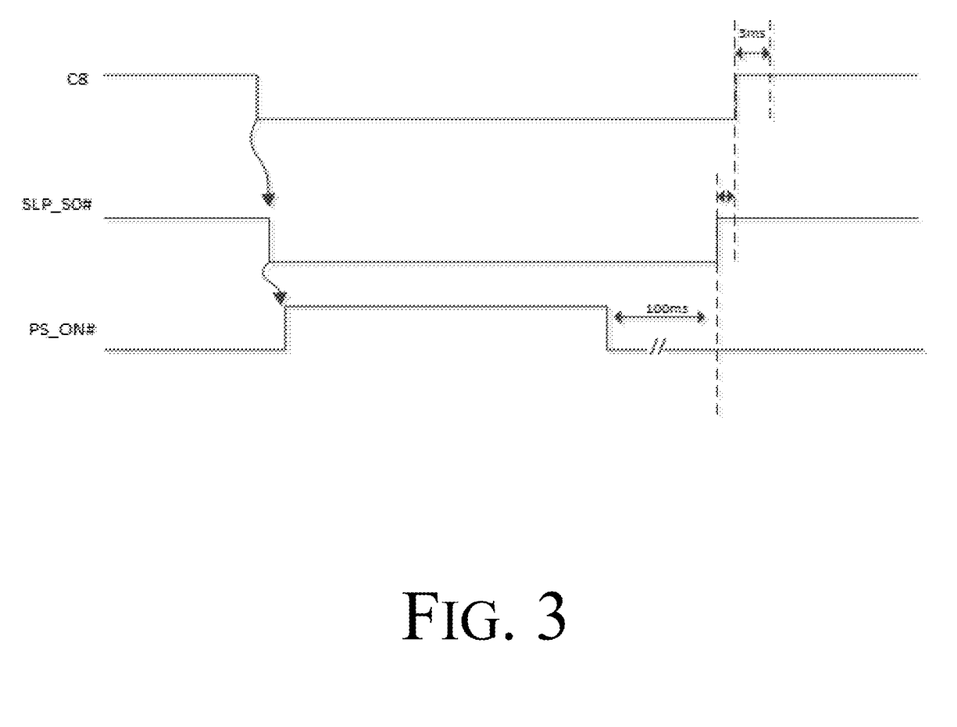
FIG. 3 is a timing diagram for power supply unit (PSU) switching in accordance with some examples.

If, at operation 544, the power manager 176 executing on controller 170 detects that the processor 122 has transitioned to the target low power state (e.g., a C8 power state) then control passes to operation 546 and the power manager 176 executing on controller 170 asserts an SLP_S0# on the communication bus which couples the controller 170 to the switch 232, which causes the switch to change the output from operating power rail 224 to standby power rail 226. Power manager 176 executing on controller 170 also implements a delay. At operation 548 the power manager 176 executing on controller 170 deasserts a PS_ON# on the communication bus which couples the controller 170 to the power supply unit 220, which shuts off the operating power rail(s) 222, 224. Thus, operations 546-548 allow the power manager 176 on the controller 170 to switch the switch 232 to selectively couple VCC IN to the standby power rail 226 in response to the processor 122 entering the target low power state (e.g., a C8 power state). FIG. 3 is a timing diagram illustrating these operations for power supply unit (PSU) switching in accordance with some examples.

At operation 550 the power manager 176 in controller 170 monitors to determine whether a SMI break event has occurred or whether a time event has occurred (e.g., if the WAKE timer has elapsed). If, at operation 550 one or both of these events has occurred then control passes to operation 552 and the power manager 176 operating on controller 170 asserts a PS_ON# on the communication bus which couples the controller 170 to the power supply unit 220, which activates the operating power rail(s) 222, 224. The power manager 176 on controller 170 may implement a delay, e.g., 100 milliseconds. At operation 554 the power manager 176 on controller 170 deasserts an SLP_S0# on the communication bus which couples the controller 170 to the switch 232, which causes the switch to change the output from standby power rail 226 to operating power rail 224. Power manager 176 executing on controller 170 also implements a delay. Thus, operations 552-554 allow the power manager 176 on the controller 170 to switch the switch 232 to selectively couple VCC IN to the operating power rail 224 prior to the processor 122 exiting a C8 power state.

At operation 556 the power management module 176 in the controller 170 asserts an SMI break on the communication bus that couples the controller 170 to the processor 122. In response, at operation 528 processor 122 clears any existing SMI break events and at operation 530 restores the state of SMI break events in the processor 122. At operation 532 the processor 122 exits SMM and may continue in an operational mode.

Figure 6:
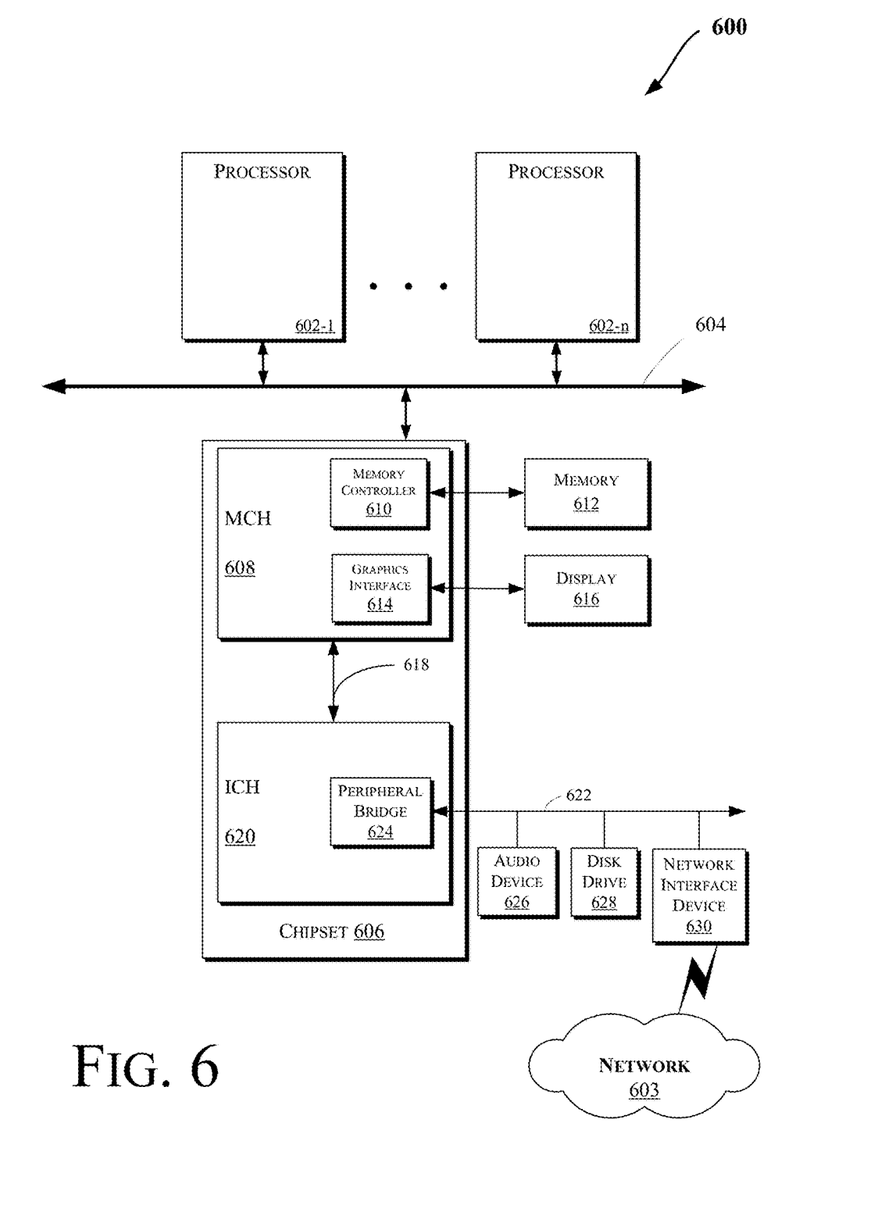
FIGS. 6-10 are schematic illustrations of electronic devices which may be adapted to include power supply unit (PSU) switching in accordance with some examples.

As described above, in some examples the electronic device may be embodied as an information processing system. FIG. 6 illustrates a block diagram of an information processing system 600 in accordance with an example. The information processing system 600 may include one or more central processing unit(s) 602 or processors that communicate via an interconnection network (or bus) 604. The processors 602 may include a general purpose processor, a network processor (that processes data communicated over a computer network 603), or other types of a processor (including a reduced instruction set computer (RISC) processor or a complex instruction set computer (CISC)). Moreover, the processors 602 may have a single or multiple core design. The processors 602 with a multiple core design may integrate different types of processor cores on the same integrated circuit (IC) die. Also, the processors 602 with a multiple core design may be implemented as symmetrical or asymmetrical multiprocessors.

A chipset 606 may also communicate with the interconnection network 604. The chipset 606 may include a memory control hub (MCH) 608. The MCH 608 may include a memory controller 610 that communicates with a memory 612. The memory 412 may store data, including sequences of instructions, that may be executed by the processor 602, or any other device included in the computing system 600. In one example, the memory 612 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 604, such as multiple processor(s) and/or multiple system memories.

The MCH 608 may also include a graphics interface 614 that communicates with a display device 616. In one example, the graphics interface 614 may communicate with the display device 616 via an accelerated graphics port (AGP). In an example, the display 616 (such as a flat panel display) may communicate with the graphics interface 614 through, for example, a signal converter that translates a digital representation of an image stored in a storage device such as video memory or system memory into display signals that are interpreted and displayed by the display 616. The display signals produced by the display device may pass through various control devices before being interpreted by and subsequently displayed on the display 616.

A hub interface 618 may allow the MCH 608 and an input/output control hub (ICH) 620 to communicate. The ICH 620 may provide an interface to I/O device(s) that communicate with the computing system 600. The ICH 620 may communicate with a bus 622 through a peripheral bridge (or controller) 624, such as a peripheral component interconnect (PCI) bridge, a universal serial bus (USB) controller, or other types of peripheral bridges or controllers. The bridge 624 may provide a data path between the processor 602 and peripheral devices. Other types of topologies may be utilized. Also, multiple buses may communicate with the ICH 620, e.g., through multiple bridges or controllers. Moreover, other peripherals in communication with the ICH 620 may include, in various examples, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 622 may communicate with an audio device 626, one or more disk drive(s) 628, and a network interface device 630 (which is in communication with the computer network 603). Other devices may communicate via the bus 622. Also, various components (such as the network interface device 630) may communicate with the MCH 608 in some examples. In addition, the processor 602 and one or more other components discussed herein may be combined to form a single chip (e.g., to provide a System on Chip (SOC)). Furthermore, the graphics accelerator 616 may be included within the MCH 608 in other examples.

Furthermore, the information processing system 600 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 628), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 7:
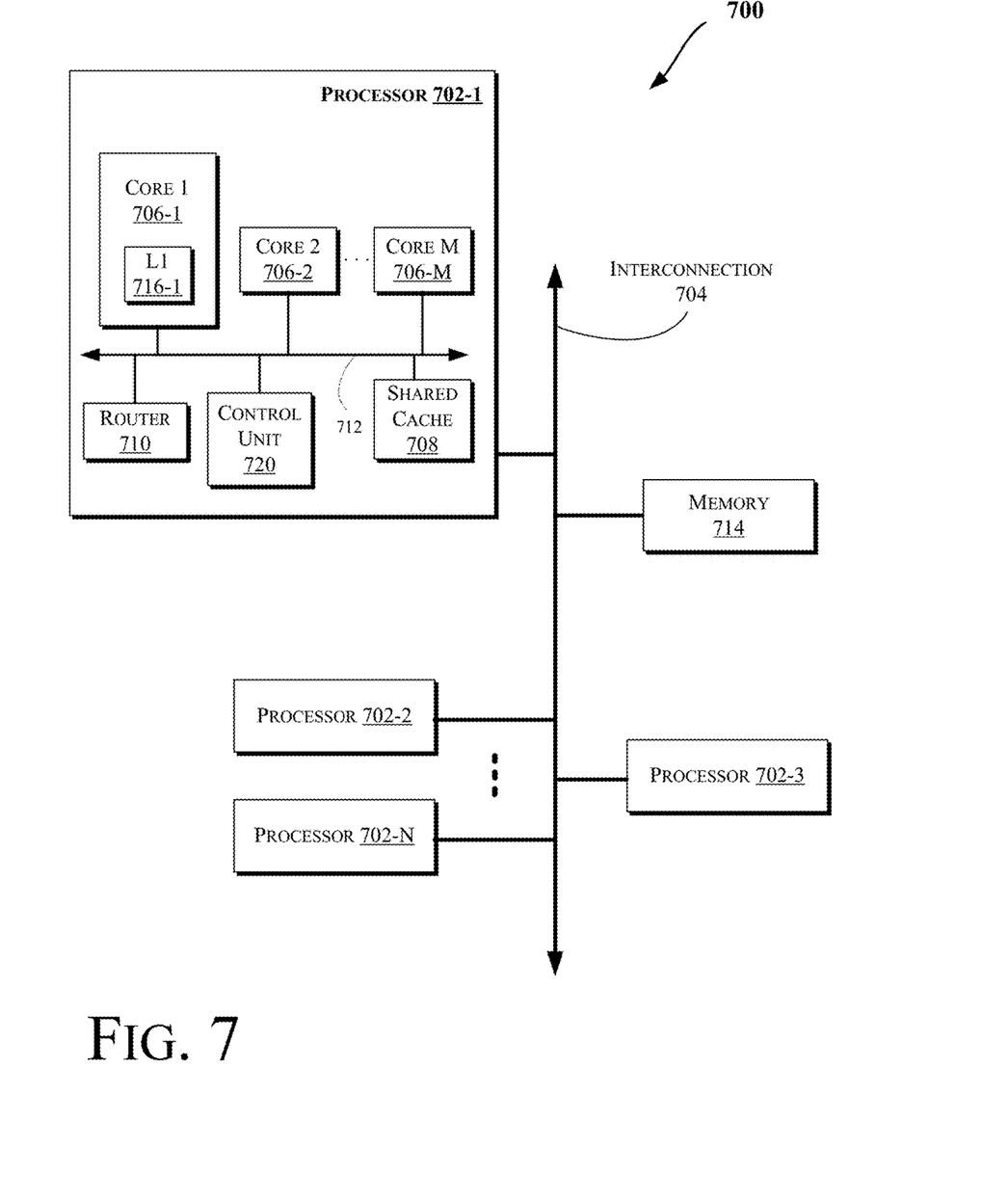

FIG. 7 illustrates a block diagram of an information processing system 700, according to an example. The information processing system 700 may include one or more processors 702-1 through 702-N (generally referred to herein as "processors 702" or "processor 702"). The processors 702 may communicate via an interconnection network or bus 704. Each processor may include various components some of which are only discussed with reference to processor 702-1 for clarity. Accordingly, each of the remaining processors 702-2 through 702-N may include the same or similar components discussed with reference to the processor 702-1.

In an example, the processor 702-1 may include one or more processor cores 706-1 through 706-M (referred to herein as "cores 706" or more generally as "core 706"), a shared cache 708, a router 710, and/or a processor control logic or unit 720. The processor cores 706 may be implemented on a single integrated circuit (IC) chip. Moreover, the chip may include one or more shared and/or private caches (such as cache 708), buses or interconnections (such as a bus or interconnection network 712), memory controllers, or other components.

In one example, the router 710 may be used to communicate between various components of the processor 702-1 and/or system 700. Moreover, the processor 702-1 may include more than one router 710. Furthermore, the multitude of routers 710 may be in communication to enable data routing between various components inside or outside of the processor 702-1.

The shared cache 708 may store data (e.g., including instructions) that are utilized by one or more components of the processor 702-1, such as the cores 706. For example, the shared cache 708 may locally cache data stored in a memory 714 for faster access by components of the processor 702. In an example, the cache 708 may include a mid-level cache (such as a level 2 (L2), a level 3 (L3), a level 4 (L4), or other levels of cache), a last level cache (LLC), and/or combinations thereof. Moreover, various components of the processor 702-1 may communicate with the shared cache 708 directly, through a bus (e.g., the bus 712), and/or a memory controller or hub. As shown in FIG. 7, in some examples, one or more of the cores 706 may include a level 1 (L1) cache 716-1 (generally referred to herein as "L1 cache 716").

Figure 8:
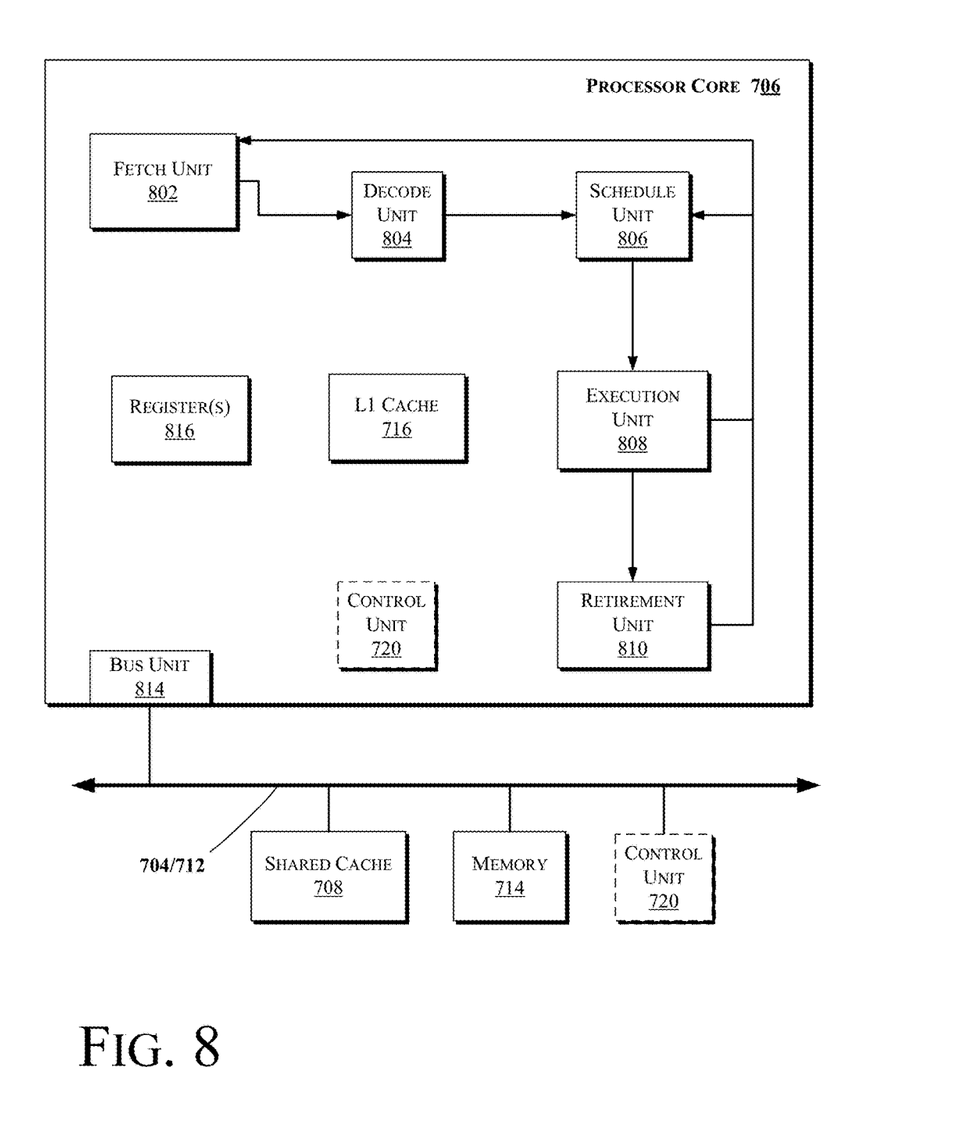

FIG. 8 illustrates a block diagram of portions of a processor core 706 and other components of an information processing system, according to an example. In one example, the arrows shown in FIG. 8 illustrate the flow direction of instructions through the core 706. One or more processor cores (such as the processor core 706) may be implemented on a single integrated circuit chip (or die) such as discussed with reference to FIG. 7. Moreover, the chip may include one or more shared and/or private caches (e.g., cache 708 of FIG. 7), interconnections (e.g., interconnections 704 and/or 112 of FIG. 7), control units, memory controllers, or other components.

As illustrated in FIG. 8, the processor core 706 may include a fetch unit 802 to fetch instructions (including instructions with conditional branches) for execution by the core 706. The instructions may be fetched from any storage devices such as the memory 714. The core 706 may also include a decode unit 804 to decode the fetched instruction.

For instance, the decode unit 804 may decode the fetched instruction into a plurality of micro-operations.

Additionally, the core 706 may include a schedule unit 806. The schedule unit 806 may perform various operations associated with storing decoded instructions (e.g., received from the decode unit 804) until the instructions are ready for dispatch, e.g., until all source values of a decoded instruction become available. In one example, the schedule unit 806 may schedule and/or issue (or dispatch) decoded instructions to an execution unit 808 for execution. The execution unit 808 may execute the dispatched instructions after they are decoded (e.g., by the decode unit 804) and dispatched (e.g., by the schedule unit 806). In an example, the execution unit 808 may include more than one execution unit. The execution unit 808 may also perform various arithmetic operations such as addition, subtraction, multiplication, and/or division, and may include one or more an arithmetic logic units (ALUs). In an example, a co-processor (not shown) may perform various arithmetic operations in conjunction with the execution unit 808.

Further, the execution unit 808 may execute instructions out-of-order. Hence, the processor core 706 may be an out-of-order processor core in one example. The core 706 may also include a retirement unit 810. The retirement unit 810 may retire executed instructions after they are committed. In an example, retirement of the executed instructions may result in processor state being committed from the execution of the instructions, physical registers used by the instructions being de-allocated, etc.

The core 706 may also include a bus unit 714 to enable communication between components of the processor core 706 and other components (such as the components discussed with reference to FIG. 8) via one or more buses (e.g., buses 804 and/or 812). The core 706 may also include one or more registers 816 to store data accessed by various components of the core 706 (such as values related to power consumption state settings).

Furthermore, even though FIG. 7 illustrates the control unit 720 to be coupled to the core 706 via interconnect 812, in various examples the control unit 720 may be located elsewhere such as inside the core 706, coupled to the core via bus 704, etc.

Figure 9:
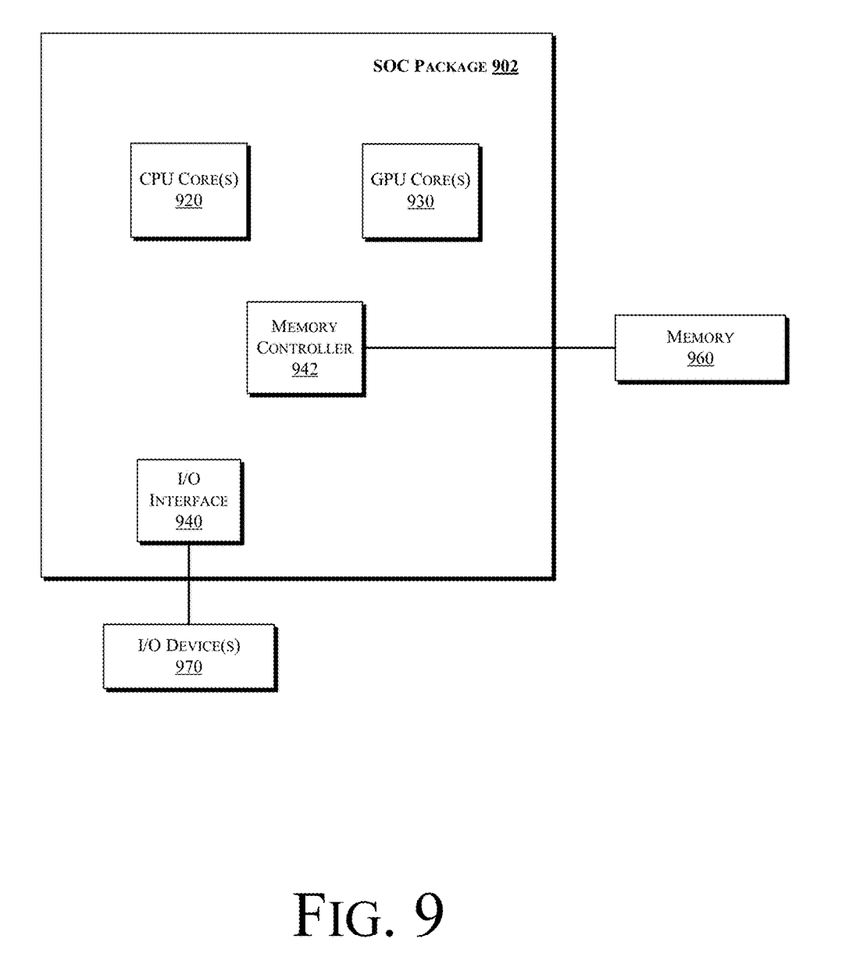

In some examples, one or more of the components discussed herein can be embodied as a System On Chip (SOC) device. FIG. 9 illustrates a block diagram of an SOC package in accordance with an example. As illustrated in FIG. 9, SOC 902 includes one or more processor cores 920, one or more graphics processor cores 930, an Input/Output (I/O) interface 940, and a memory controller 942. Various components of the SOC package 902 may be coupled to an interconnect or bus such as discussed herein with reference to the other figures. Also, the SOC package 902 may include more or less components, such as those discussed herein with reference to the other figures. Further, each component of the SOC package 902 may include one or more other components, e.g., as discussed with reference to the other figures herein. In one example, SOC package 902 (and its components) is provided on one or more Integrated Circuit (IC) die, e.g., which are packaged into a single semiconductor device.

As illustrated in FIG. 9, SOC package 902 is coupled to a memory 960 (which may be similar to or the same as memory discussed herein with reference to the other figures) via the memory controller 942. In an example, the memory 960 (or a portion of it) can be integrated on the SOC package 902.

The I/O interface 940 may be coupled to one or more I/O devices 970, e.g., via an interconnect and/or bus such as discussed herein with reference to other figures. I/O device(s) 970 may include one or more of a keyboard, a mouse, a touchpad, a display, an image/video capture device (such as a camera or camcorder/video recorder), a touch surface, a speaker, or the like.

Figure 10:
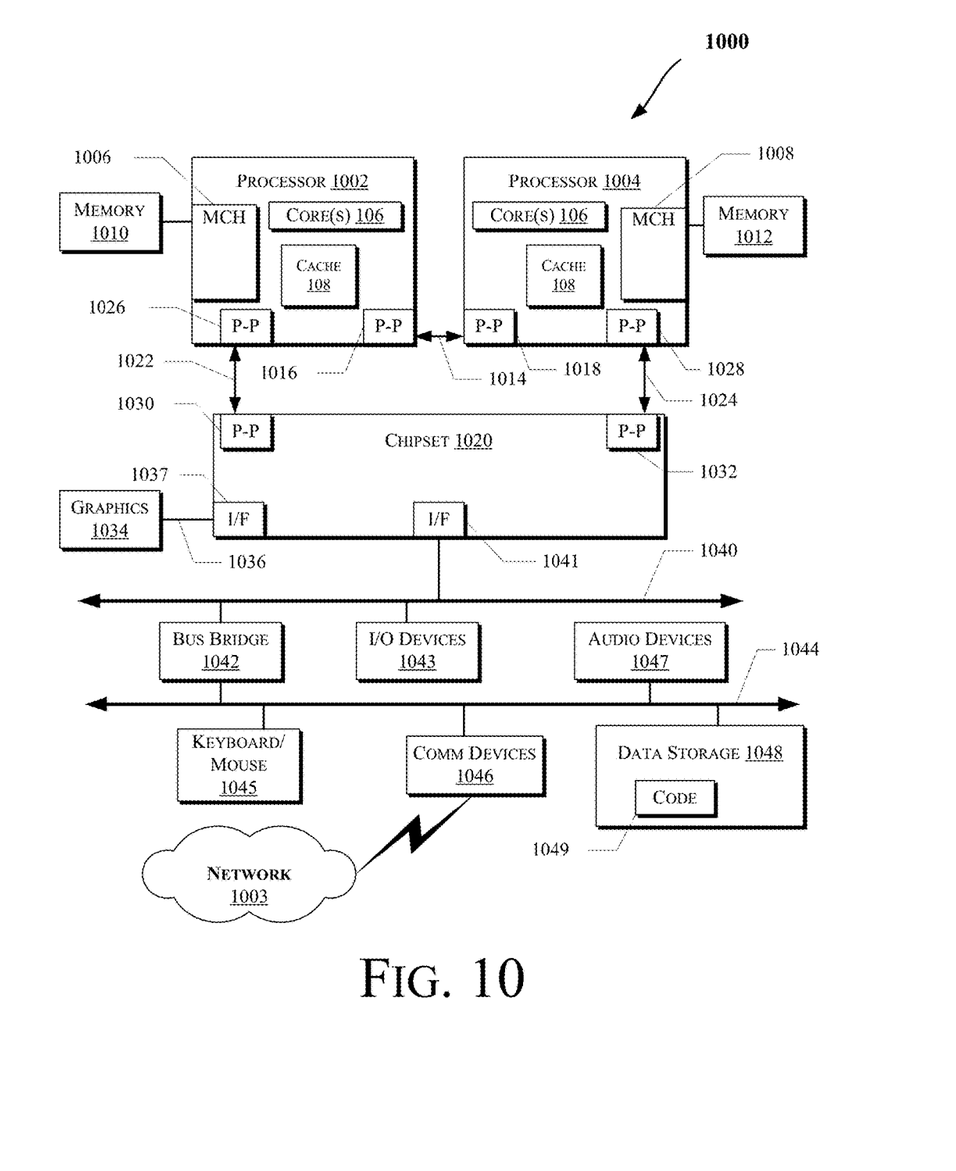

FIG. 10 illustrates an information processing system 1000 that is arranged in a point-to-point (PtP) configuration, according to an example. In particular, FIG. 10 shows a system where processors, memory, and input/output devices are interconnected by a number of point-to-point interfaces.

As illustrated in FIG. 10, the system 1000 may include several processors, of which only two, processors 1002 and 1004 are shown for clarity. The processors 1002 and 1004 may each include a local memory controller hub (MCH) 1006 and 1008 to enable communication with memories 1010 and 1012.

In an example, the processors 1002 and 1004 may be one of the processors 702 discussed with reference to FIG. 7. The processors 1002 and 1004 may exchange data via a point-to-point (PtP) interface 1014 using PtP interface circuits 1016 and 1018, respectively. Also, the processors 1002 and 1004 may each exchange data with a chipset 1020 via individual PtP interfaces 1022 and 1024 using point-to-point interface circuits 1026, 1028, 1030, and 1032. The chipset 1020 may further exchange data with a high-performance graphics circuit 1034 via a high-performance graphics interface 1036, e.g., using a PtP interface circuit 1037.

The chipset 1020 may communicate with a bus 1040 using a PtP interface circuit 1041. The bus 1040 may have one or more devices that communicate with it, such as a bus bridge 1042 and I/O devices 1043. Via a bus 1044, the bus bridge 1043 may communicate with other devices such as a keyboard/mouse 1045, communication devices 1046 (such as modems, network interface devices, or other communication devices that may communicate with the computer network 1003), audio I/O device, and/or a data storage device 1048. The data storage device 1048 (which may be a hard disk drive or a NAND flash based solid state drive) may store code 1049 that may be executed by the processors 1004.

The following examples pertain to further examples.

Example 1 is an electronic device, comprising a power supply comprising an operating power rail and a standby power rail, a processing platform capable to switch between an operating power state and at least one low power state, a switch to selectively couple a power input of the processing platform to one of the operating power rail or the standby power output rail, and logic, at least partially including hardware logic, to activate the switch based at least in part on the operating state of the processing platform.

In Example 2, the subject matter of Example 1 can optionally include an arrangement in which the power supply receives an alternating current (AC) input, the operating power rail provides a direct current (DC) output, and the standby power rail provides a DC output.

In Example 3, the subject matter of any one of Examples 1-2 can optionally include an arrangement in which the at least one low power state comprises at least one of a C3 state, a C4 state, a C5 state, a C6 state, a C7 state, a C8 state, a C9 state, or a C10 state.

In Example 4, the subject matter of any one of Examples 1-3 can optionally include an arrangement in which the processing platform comprises at least one processor and a controller separate from the at least one processor.

In Example 5, the subject matter of any one of Examples 1-4 can optionally include an arrangement in which the processor comprises logic, at least partially including hardware logic, to place the processor in a system management mode (SMM) prior to a transition from the operating power state to the at least one low-power state.

In Example 6, the subject matter of any one of Examples 1-6 can optionally include an arrangement in which the processor comprises logic, at least partially including hardware logic, to transition the processor from the system management mode (SMM) to the at least one low power state in response to a determination that a time to a next wake event is less than a threshold.

In Example 7, the subject matter of any one of Examples 1-6 can optionally include an arrangement in which the processor comprising logic, at least partially including hardware logic, to transition the processor from the system management mode (SMM) to the at least one low power state in response to a determination that a platform latency tolerance is less than a threshold.

In Example 8, the subject matter of any one of Examples 1-7 can optionally include an arrangement in which the processor comprises logic, at least partially including hardware logic, to forward the time to the next wake event to the controller.

In Example 9, the subject matter of any one of Examples 1-8 can optionally include an arrangement in which the controller comprises logic, at least partially including hardware logic, to program a wake timer using the time to the next wake event.

In Example 10, the subject matter of any one of Examples 1-9 can optionally include an arrangement in which the processor comprises logic, at least partially including hardware logic, to forward a PCIe WAKE configuration to the controller.

In Example 11, the subject matter of any one of Examples 1-10 can optionally include an arrangement in which the controller comprises logic, at least partially including hardware logic, to configure the controller to activate an interrupt in response to an assertion on a WAKE pin.

In Example 12, the subject matter of any one of Examples 1-11 can optionally include an arrangement in which the processor comprises logic, at least partially including hardware logic, to enable a SMI break from the at least one low power state for an interrupt from the controller and disable one or more additional SMI breaks from the at least one low power state.

In Example 13, the subject matter of any one of Examples 1-12 can optionally include an arrangement in which the controller comprises logic, at least partially including hardware logic, to assert an SLP_S0# signal and implement a delay for a predetermined time period.

In Example 14, the subject matter of any one of Examples 1-13 can optionally include an arrangement in which the controller comprises logic, at least partially including hardware logic, to deassert a PS_ON# signal.

In Example 15, the subject matter of any one of Examples 1-14 can optionally include an arrangement in which the controller comprises logic, at least partially including hardware logic, to determine that at least one of a break event or a timer expiration has occurred, and in response to the determination, to assert an PS_ON# signal and implement a delay for a predetermined time period.

In Example 16, the subject matter of any one of Examples 1-15 can optionally include an arrangement in which the controller comprises logic, at least partially including hardware logic, to deassert a SLP_S0# signal.

In Example 17, the subject matter of any one of Examples 1-16 can optionally include an arrangement in which the controller comprises logic, at least partially including hardware logic, to assert a SMI break event to the processor.

In Example 18, the subject matter of any one of Examples 1-17 can optionally include an arrangement in which the processor comprises logic, at least partially including hardware logic, to clear the SMI break event and restore a state of one or more break events.

In Example 19, the subject matter of any one of Examples 1-18 can optionally include an arrangement in which the processor comprises logic, at least partially including hardware logic, to exit the system management mode (SMM) state.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and examples are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and examples are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and examples are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular examples, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one example" or "some examples" means that a particular feature, structure, or characteristic described in connection with the example is included in at least an implementation. The appearances of the phrase "in one example" in various places in the specification may or may not be all referring to the same example.

Although examples have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An electronic device, comprising:
a processing platform comprising a processor capable to switch between an operating power state and at least one low power state and a platform control hub;
a power supply comprising an operating power rail and a standby power rail;
a switch to selectively couple a power input of the processing platform to one of the operating power rail or the standby power rail; and
a controller communicatively coupled to the platform control hub;
the processor comprising logic, at least partially including hardware logic, which, in response to a determination that a time to the next target wake event (TNT) exceeds a first threshold and a system latency tolerance (LTR) exceeds a second threshold, is to:
forward the time to a next wake event to the controller; and
forward a PCIe WAKE configuration to the controller;
the controller comprising logic, at least partially including hardware logic, to:
generate a signal which activates the switch to couple the power input of the processing platform to the standby power rail in response to detecting that the processor has transitioned to the at least one low power state.

2. The electronic device of claim 1, wherein:
the power supply receives an alternating current (AC) input;
the operating power rail provides a direct current (DC) output; and
the standby power rail provides a DC output.

3. The electronic device of claim 1, wherein the at least one low power state comprises at least one of a C3 state, a C4 state, a C5 state, a C6 state, a C7 state, a C8 state, a C9 state, or a C10 state.

4. The electronic device of claim 1, wherein the controller comprises logic, at least partially including hardware logic, to:
program a wake timer using the time to the next wake event.

5. The electronic device of claim 1, wherein the controller comprises logic, at least partially including hardware logic, to:
configure the controller to activate an interrupt in response to an assertion on a WAKE pin.

6. The electronic device of claim 1, wherein the processor comprises logic, at least partially including hardware logic, to:
enable a SMI break from the at least one low power state for an interrupt from the controller; and
disable one or more additional SMI breaks from the at least one low power state.

7. The electronic device of claim 6, wherein the controller comprises logic, at least partially including hardware logic, to:
assert an SLP_S0# signal; and
implement a delay for a predetermined time period.

8. The electronic device of claim 7, wherein the controller comprises logic, at least partially including hardware logic, to:
deassert a PS_ON# signal.

9. The electronic device of claim 8, wherein the controller comprises logic, at least partially including hardware logic, to:
determine that at least one of a break event or a timer expiration has occurred, and in response to the determination, to:
assert an PS_ON# signal; and
implement a delay for a predetermined time period.

10. The electronic device of claim 9, wherein the controller comprises logic, at least partially including hardware logic, to:
deassert a SLP_S0# signal.

11. The electronic device of claim 9, wherein the controller comprises logic, at least partially including hardware logic, to:
assert a SMI break event to the processor.

12. The electronic device of claim 9, wherein the processor comprises logic, at least partially including hardware logic, to:
clear the SMI break event; and
restore a state of one or more break events.

13. The electronic device of claim 9, wherein the processor comprises logic, at least partially including hardware logic, to:
exit the system management mode (SMM) state.

* * * * *